United States Patent [19]

Bennett et al.

[11] Patent Number: 5,106,422
[45] Date of Patent: Apr. 21, 1992

[54] RAPID-SETTING FLOWABLE BACKFILL COMPOSITION AND METHOD OF USING

[75] Inventors: Bruce H. Bennett, Westerville; Gary J. Jablonski, Dublin; Michael Bahleda, Columbus; Claude W. Frishette, II, Carroll; Paul R. Stodola, Pickerington, all of Ohio

[73] Assignee: American Electric Power Service Corporation, Columbus, Ohio

[21] Appl. No.: 643,894

[22] Filed: Jan. 18, 1991

[51] Int. Cl.$^5$ .............................................. C04B 18/06
[52] U.S. Cl. ..................................... 106/705; 106/707; 106/DIG. 1
[58] Field of Search ................ 106/705, 707, DIG. 1, 106/900

[56] References Cited

U.S. PATENT DOCUMENTS

| | | | |
|---|---|---|---|
| 2,987,411 | 11/1957 | Minnick | 106/288 |
| 3,141,857 | 7/1964 | Sommer | 260/2.5 |
| 3,814,614 | 6/1974 | Kraemer et al. | 106/97 |
| 4,050,950 | 9/1977 | Brewer et al. | 106/97 |
| 4,101,332 | 7/1978 | Nicholson | 106/85 |
| 4,321,243 | 3/1982 | Cornwell et al. | 423/268 |
| 4,429,456 | 2/1984 | Zahn | 29/798 |
| 4,472,198 | 9/1984 | Nowicki et al. | 106/85 |
| 4,501,830 | 2/1985 | Miller et al. | 523/401 |
| 4,624,711 | 11/1986 | Styron | 106/308 |
| 4,741,834 | 5/1988 | Spangle et al. | 210/683 |
| 4,770,709 | 9/1988 | Loggers | 106/118 |
| 4,804,147 | 1/1989 | Hooper | 241/24 |
| 4,815,891 | 3/1989 | O'Connor | 404/77 |
| 4,859,344 | 8/1989 | Spangle et al. | 210/683 |
| 4,877,453 | 10/1989 | Loggers | 106/118 |
| 4,917,733 | 4/1990 | Hansen | 106/707 |

OTHER PUBLICATIONS

"Controlled Density Fill", Western Ash Company, Phoenix, AZ., 1990, Bulletin.

*Primary Examiner*—Mark L. Bell
*Assistant Examiner*—Deborah Jones
*Attorney, Agent, or Firm*—Michael Sand Co.

[57] ABSTRACT

The subject invention relates to a rapid-setting self-hardening backfill composition and method of installation. The composition comprising a minor amount of Class C fly ash as a primary constituent and other filler materials such as Class F fly ash in major amount. When such materials are combined with water in controlled amount, they produce a backfilling material which is flowable and self-leveling for easy installation in utility trenches and similar excavations in street and roadway surfaces to support relatively heavy compressive loads within relatively short periods of time without settling. The self-hardening initially flowable mixtures attain considerable strength for withstanding traffic loads without undue settling in time periods of about 4 hours. The rapid-setting of the composition provides a rapidly attainable strength of the order of about 20 psi within about 4 hours to permit overlaying a wearing course of paving material and reopening of excavated areas of streets and roadways without undue traffic delays and congestion. The backfilling composition ranges in amount from about 2 to 10 parts by weight filler material to about 1 part by weight Class C fly ash with sufficient water to react with both Class C fly ash and filler material. The composition utilizes by-products of coal-fired power stations to form a most economical backfilling material and method of utilization to provide both early strength and precisely controlled permanent strength to permit ready reexcavation.

25 Claims, No Drawings

RAPID-SETTING FLOWABLE BACKFILL COMPOSITION AND METHOD OF USING

BACKGROUND OF THE INVENTION

1. Technical Field

The present invention relates generally to utilization of fly ashes and other by-products of coal combustion in the generation of electrical power by coal-fired power stations. The invention relates, more particularly, to a rapid-setting self-hardening flowable backfilling composition which contains coal combustion by-products and method of utilizing same which permits backfilling of excavated utility trenches, the composition having an early strength gain to withstand normal roadway traffic loads without undue settling.

2. Background Information

The backfilling of utility trenches in roadway surfaces, for example, trenches for gas, water, sewer and electrical conduits, has often created problems in the past wherein the roadway surfaces must be closed to traffic for considerable periods of time to allow the backfilling material to gain sufficient strength to withstand placement of a paving course overlay and subsequent exposure to normal roadway traffic loads. After the ordinary maintenance, repair, or installation of conduits under roadway surfaces, lengthy periods of time and special materials have been required for such backfilling of excavations prior to laying down a paving course and resuming normal traffic over such filled excavations. This is particularly true where the pavement or other wearing course must be placed over a backfilled conduit area to withstand heavy loads. Where a conduit line is installed using the open trench method of construction and where relatively poor soil conditions exist, the normal method of construction to obtain the desired compaction of the backfilled material has been to remove the original soil and replace it with sand, gravel, or the intermixed original material, to obtain the specified backfill condition to withstand traffic loads. In some cases, it has been necessary to backfill in relatively thin layers and then mechanically compact each such layer which has resulted in a very expensive method of construction and maintenance which is unduly time consuming.

Additional problems have been encountered where the soil bedding for the conduit has been so undesirable that it must be removed and replaced with adequate bedding material for the conduit. It is important to have proper bedding under conduits so that the resulting compressive forces are equalized throughout the length of the conduit especially under roadway surfaces where rigid pipe is utilized as the conduit material. If the bedding or backfill does not uniformly support the conduit throughout its length, the conduit may be sheared, ruptured or otherwise fail, due to uneven compressive loading.

Where utility trenches are backfilled, the use of concrete is not an adequate solution to provide proper support for the conduit or the overlying roadway surfaces. If the backfill material is concrete, it is extremely difficult and expensive to subsequently excavate through the concrete to either repair or replace the conduit, or install lateral connections to the conduit, as desired or required.

In the prior art, controlled density fill materials have been utilized which include a Portland cement as one of their constituents; however, such cement-containing compositions normally attain much greater strength than required and present severe problems upon reexcavation for subsequent maintenance, repair or modification of the conduits. Some such backfilling materials for conduit trenches have obtained compressive strengths in the range of 200 to 800 psi which make reexcavation extremely difficult and costly to perform. Existing flowable backfilling materials which have been designated as controlled-density fill materials do not have the normal structural strength of concrete and require more expensive constituents than the present invention to obtain desired compressive strengths which are less than conventional concrete.

The present invention utilizes primarily fly ashes which are by-products from coal-fired power stations which are relatively inexpensive and readily available. Some particular fly ashes exhibit cementitious properties which are valuable for the preparation of rapid-setting self-hardening backfill materials which are capable of meeting city street and state highway road specifications for backfill materials beneath roadways. Class C fly ash containing significant amounts of calcium oxide is particularly valuable for use in the subject invention to obtain high early strength which is readily controllable within desired limits and permit its ready use in roadway excavations which may be reexcavated as required without difficulty.

SUMMARY OF THE INVENTION

It is an object of this invention to provide a rapid-setting self-hardening backfill material which utilizes a minor amount of Class C fly ash as a primary constituent and which is capable of interaction with other filler materials in major amount. When such materials are combined with water in controlled amount, they produce a backfilling material which is flowable and self-leveling for easy installation into utility trenches within roadways as well as other areas to support relatively heavy compressive loads within relatively short periods of time without settling. The utilization of Class C fly ash containing calcium oxide in conjunction with other fly ashes, such as Class F fly ash, or other filler materials, to react with controlled amounts of water, provide self-hardening initially-flowable mixtures which attain considerable strength for withstanding traffic loads without undue settling in time periods of about four (4) hours. Such early hardening to obtain a rapidly attainable compressive strength of the order of about 20 psi within about four (4) hours permits re-opening of excavated areas of streets and roadways without undue traffic delays and congestion.

Another object of this invention is to provide a backfilling material which utilizes readily-available raw materials which attain high early-strength gain for short-term reforming or reconstruction of roadway sub-surfaces after excavation of selected areas wherein the roadway surfaces may be reopened at an early date and are capable of withstanding normal traffic loads without undue settling after placement of a paving course overlay. The backfilling material may be overlaid with a wearing course of paving material within about four (4) hours to obtain high early-strength gain which strength progressively increases over relatively short periods of time to a maximum compressive strength which permits reexcavation of the backfilled areas without undue difficulty and at lesser expense. Thus, the backfilling material which utilizes various classes and types of coal combustion by-products is capable of curing to a high early strength without the addition of chemical additives or cementitious materials, and further cures to a maximum strength substantially less than concrete to facilitate easy reexcavation. The rapid-setting self-hardening flowable backfill material primarily comprises various types of coal combustion filler material in major amount, Class C fly ash in minor amount, and sufficient water to react with said Class C fly ash and filler material to form a self-leveling non-settling flowable material to facilitate relatively easy installation and subsequent overlaying of a durable wearing course of paving material. In a preferred form of the invention, the backfilling composition ranges in amount from about 2 to 10 parts by weight filler material to about 1 part by weight Class C fly ash with sufficient water to react with both the Class C fly ash and filler material. The filler material in major amount may be comprised of Class F fly ash having different properties and characteristics than the Class C fly ash, the Class F and Class C fly ashes both being considered essentially pozzolanic materials except Class C fly ash also possesses cementitious properties. The backfilling composition is extremely economical in its use of normally discarded by-products of coal combustion which are intermixed with water in controlled amount at the excavation site at the time and place of the backfilling operation. The components may have varying fineness and the Class C fly ash must be kept in a dry state until intimate intermixing with water as the only required reactive liquid component. It is not essential that the Class F fly ash be kept in a dry state.

Following the removal of the original soil from utility trenches, for example, and suitable repair or maintenance of underground conduits, the subject backfilling material is used to backfill the excavations to substantially fill the same, the composition being combinedly mixed "in situ" for immediate flowable self-leveling installation to permit over-layment of a paving material within a short time period. The backfilling material is capable of obtaining an initial unconfined compressive strength of the order of about 20 psi within about four (4) hours so that a wearing course can be placed to reopen the roadway to traffic, the backfilling material also being able to withstand other types of compressive loading such as where structures are built thereover including buildings, bridge abutments, embankments, or other structures which create substantial compressive loads. The subject fly ash containing backfill material does not experience the uneven settling after passage of heavy loads thereover which is common with conventional soil backfill material.

DESCRIPTION OF THE PREFERRED EMBODIMENT

The invention involves the utilization of readily available and economical raw materials namely, fly ashes which are basically pozzolanic materials which are generated in large quantities by coal-burning power stations. A preferred material is Class C fly ash containing a significant quantity of calcium oxide having pozzolanic and cementitious properties which reacts with water to form calcium hydroxide and other hydration products which subsequently harden into a relatively strong structural material having controlled strength.

According to ASTM Designation No. C618-89, Class C fly ash is defined as fly ash normally produced from lignite or sub-bituminous coal which meets the applicable requirements for this class being a finely divided residue that results from the combustion of ground or powdered coal. This class of fly ash in addition to having pozzolanic properties also has cementitious properties. Some Class C fly ashes may contain lime contents higher than 10 percent by weight. Class F fly ash is defined as fly ash normally produced from burning anthracite or bituminous coal which meets the applicable requirements for this class which also has some pozzolanic properties. For purposes of this invention, a minor amount of Class C fly ash along with a major amount of filler material and water is preferred for obtaining the desired early-strength gain of the reacted material with controlled minimum and maximum strength gain for a roadway backfilling material.

The self-hardening flowable backfill material of this invention comprises an intimately-combined filler material in major amount which may consist of Class F fly ash, coal combustion bottom ash and coal combustion boiler slag, the latter two materials being much coarser than the indicated Class F fly ash. The fineness of the filler material may vary through wide limits and does not necessarily require a fineness comparable to most fly ashes. The composition utilizes a minor amount of Class C fly ash which has the higher lime content as indicated for this class designation. The filler material ranges in amount from about 2 to 10 parts by weight to about 1 part by weight Class C fly ash, a preferable ratio being about 3 parts filler material to 1 part Class C fly ash. A preferred filler material is Class F fly ash having less pronounced cementitious properties than the Class C fly ash.

A typical Class F fly ash from the Picway, Ohio power plant of Columbus Southern Power Co. has the following representational analysis and physical properties:

TABLE I

|  | ASTM C-618 CLASS F | | % BY WEIGHT |
|---|---|---|---|
| Chemical Analysis | | | |
| Silica | | | 42.3 |
| Aluminum Oxide | | | 25.2 |
| Iron Oxide | | | 20.8 |
| Combined 1,2 & 3 | Min | 70% | 88.2 |
| Titanium Dioxide | | | 1.6 |
| Calcium Oxide | | | 0.7 |
| Sodium Oxide | | | 0.3 |
| Potassium Oxide | | | 1.5 |
| Sulfur Trioxide | Max | 5% | 1.1 |
| Phosphorus Pentoxide | | | 0.2 |
| Other Constituents | | | 4.7 |
| Total % | | | 99.9 |
| ph @ 26° C., 1% slurry | | | |
| Available Alkalies, % | Max | 1.5% | 0.46 |
| Sp. Cond., @ 21° C. | | | |
| Umho of 1% Slurry | | | 255 |
| Physical Tests | | | |
| Moisture Content, % | Max | 3% | 0.1 |
| Net Ignition Loss, % | Max | 6% | 5.32 |
| Retained on No. 325, % (wet-sieved) | Max | 34% | 22.29 |
| Specific Gravity | | | 2.30 |
| Autoclave Expansion | Max | 0.8% | 0.18 |
| Water Requirement, % Control | Max | 105% | 105 |
| Strength Activity Index | | | |
| with Cement at 28 days % Control | Min | 75% | 75 |
| with Lime at 7 days, psi | Min | 800 psi | 913 |

A typical Class C fly ash from the Rockport, Indiana power plant of Indiana Michigan Power Co. has the following representational analysis and physical properties:

TABLE II

| | ASTM-C 618 CLASS C | | % by Weight |
|---|---|---|---|
| Chemical Analysis | | | |
| Silica | | | 37.6 |
| Aluminum Oxide | | | 18.0 |
| Iron Oxide | | | 5.9 |
| Combined 1,2, & 3 | Min | 50% | 61.5 |
| Titanium Dioxide | | | 1.5 |
| Calcium Oxide | | | 25.2 |
| Magnesium Oxide | | | 5.3 |
| Sodium Oxide | | | 1.9 |
| Potassium Oxide | | | 0.4 |
| Sulfur Trioxide | Max | 5% | 1.9 |
| Phosphorus Pentoxide | | | 1.3 |
| Other Constituents | | | 0.2 |
| Total % | | | 99.2 |
| ph @ 26° C., 1% Slurry | | | 11.6 |
| Available Alkalies, % | Max | 1.5% | 1.26 |
| sp. Cond, @ 21° Umho of 1% Slurry | | | 1218 |
| Physical Tests | | | |
| Moisture Content, % | Max | 3% | 0.04 |
| Net Ignition Loss, % | Max | 6% | 0.30 |
| Retained on No. 325, % (wet-sieved) | Max | 34% | 19.05 |
| Specific Gravity | | | 2.68 |
| Autoclave Expansion | Max | 0.8% | 0.007 |
| Water Requirement, % Control | Max | 105% | 93 |
| Strength Activity Index | | | |
| with cement at 28 days, % Control | Min | 75% | 99 |
| with lime at 7 days, psi | NA | | NA |

The Class C fly ash must be maintained in a dry condition and the filler materials are normally maintained in an essentially dry condition prior to their being intermixed with a prescribed reactive amount of water, preferably at the backfilling site for installation within the excavated area or areas. A preferred ratio of total solids to water is about 2.3 to 1 parts by weight, although the water content may be varied slightly from such precise ratio depending upon the given characteristics of the particular Class C fly ash used and the preferred characteristics of the backfill material end product. A preferred combined mixture comprises about 52% by weight Class F fly ash, about 17% by weight Class C fly ash, and about 31% by weight water.

The following components are employed in the preferred backfill composition in the indicated amounts:

| PREFERRED | LOWER RANGE | UPPER RANGE |
|---|---|---|
| 500 lb. class C ash | 330 lb. class C ash | 600 lb. class C ash |
| 1550 lb. class F ash | 1620 lbs. class F ash | 1470 lb. class F ash |
| 870 lbs. water | 870 lbs. water | 850 lbs. water |

The amount of water is critical and must be sufficient for flowability and essentially self-leveling; excess water will retard adequate early strength gain. The composition is formulated in the range of 1 part Class C fly ash to 10 parts Class F fly ash (about 200 lbs. Class C to about 2000 lbs. Class F) and from 1 part Class C to 2 parts Class F (about 700 lbs. Class C to about 1400 lbs. Class F). The material is not a paving material but is a fill material to be overlain with a wearing course of paving material at a relatively short time period (e.g. 4 hours or less).

After the coal combustion by-products are intimately intermixed with water, such as by a rotary mixer, the backfilling composition is placed within the excavated areas in a flowable self-leveling condition. The excavations are substantially filled to near roadway level following which a roadway wearing course of paving material such as asphalt or concrete is installed thereover to provide a durable wear-resistant roadway surface.

The paving course can be placed over the backfill within a period of from about 2 to 4 hours depending upon the rate of strength gain. Where the overlay is comprised of asphaltic material, the roadway can be opened to traffic almost immediately. Where the overlay is concrete, a longer period is required depending upon its thickness and specific hardening properties. High early-strength concretes are available and known in the art to form such paving course.

The backfill material is capable of obtaining an unconfined compressive strength of about 20 psi within about 4 hours following which time period the pavement course overlay may be placed and the roadway surfaces may be opened to traffic without enforcing reduced traffic loads. The roadway surface may be impacted by such rolling traffic thereover without undue settlement or the formation of wavy surfaces or potholes. The backfilling material is capable of curing to approximately 25 to 40 percent of its 28-day unconfined compressive strength within about 4 hours to be fully capable of withstanding traffic loads which may vary from 2-20 tons of loading pressure without adverse effects on the backfilling material. The composition is capable of curing to approximately 60 to 75 percent of its 28-day strength gain within about 7 days, this progressive increase in compressive strength further strengthens the backfilling material during its permanent underlying of the roadway surfaces which are then in continuous traffic supporting use. The composition is capable of curing to a maximum strength of about 150 psi over its lifetime to permit ready reexcavation of the material at a subsequent date as may be desired or required. It is not uncommon for the previously excavated and backfilled areas to again require reexcavation to facilitate further maintenance or repair work on the underlying conduits. As stated, mixtures containing purely cementitious materials or those which contain Portland cements are undesirable in view of reexcavation difficulties which can and do occur with such materials.

A preferred backfill material comprising the intimately combined mixture of Class C and Class F fly ashes and water has the following representational physical properties:

TABLE III

| | |
|---|---|
| Unit Weight (Fresh Weight) | 105 lbs.ft$^3$ |
| Resistance to Penetration (Avr. At 4-Hours) | 400 psi |
| Coefficient Of Permeability | $2.6 \times 10^{-5}$ cm/sec |
| Unconfined Compressive Strength | |
| 4-Hours 30 psi (2.16 TSF)* | |
| 28 days 75 psi (5.4 TSF) | |
| 91 days <150 psi (10.8 TSF) | |
| Atterberg Limits | Non-Plastic |
| pH (At 1-Month) | 9.52 |
| Resistivity (At 1-Month) | 1160 ohm-cm |
| Redox Potential (At 1-Month) | +150 mv. |
| Thermal Resistivity (At 24-Hours) | 100° C.-cm/W |

TABLE III-continued

| Color (Can Be Modified Within Limits) | Gray |
|---|---|

*TSF is defined as tons per square foot.

The backfilling material provides a superior material for use as a backfill in utilizing readily available and most economical constituents and avoids the difficulties of layered compacting which is frequently required with other common types of backfilling materials. The subject backfilling material is intimately mixed at the site of the excavation, or closely adjacent thereto, the backfilling allows easy installation due to its flowable nature without any personnel being physically required within the trenches during the backfilling operation. The backfilling material may be very beneficially utilized under and around conduits, to fill essentially large size trenches having a significant depth. Obviously, small trenches may also be readily filled with the backfilling material. The overlaying wearing course of paving material may be compacted over the backfilling material such as by a powered roller or truck tires depending upon the surface area of the backfilling material which is preferably laid down having an exterior surface area nearly parallel in grade to the existing roadway. The overlaid paving material may have a thickness varying from 3 to 9 inches or thicker, as desired, the backfilling material being fully compatible with and capable of supporting a wide variety of conventional paving materials.

The subject method of backfilling excavated trenches in roadways essentially comprises the steps of intimately combining and intermixing the backfilling material comprising the combined mixture as aforesaid with sufficient water to react with said Class C fly ash and the filler material. The backfilling material is installed in self-leveling relation into the excavated areas of roadways to withstand placement of the paving course overlay and subsequent exposure to normal roadway traffic loads, the backfilling material having an initial unconfined compressive strength of about 20 psi within about 4 hours. The flowable backfill material is measured and intermixed immediately prior to its installation in the excavated areas to substantially fill such areas, the backfilling material being capable of initially curing to approximately 25 to 40 percent of its 28-day unconfined compressive strength gain within about 4 hours and to a maximum compressive strength of about 150 psi to permit ready reexcavation of the material.

The average trench in some utility maintenance work in certain cities is 4 feet by 6 feet by 3 feet deep which would require an average of about 2.7 cubic yards or 3.3 tons of flowable backfill material to fill such average trench size. Rockport fly ash which is economically available to a broad geographic area of North America is a Class C fly ash meaning that it is a cementitious material as well as a pozzolanic material. A pozzolan is a siliceous or a siliceous and aluminous material which when combined with lime in the presence of water will produce a cementitious material with excellent structural properties. The quick-setting characteristic of the Rockport fly ash (Class C) makes it particularly valuable for use in the subject invention although other types of Class C fly ash from other sources may be readily used. Pickway fly ash which is available in the midwest USA is a Class F fly ash meaning that it is strictly a pozzolanic material. Picway fly ash is a pozzolanic fly ash material which is known to be available in central Ohio in large tonnages and is a particularly valuable filler material for use in the subject composition.

The subject flowable backfill material made from coal ashes and boiler operation by-products allows road trench repairs to be made faster, easier and more economical. The material is unique in that it utilizes no cement or chemical additives and achieves sufficient early strength to allow repaving operations to be undertaken quickly and permanently. The subject backfilling material is especially valuable for backfilling trenches for utility work on water lines, sewer lines, gas lines, and buried electrical cable. The use of such readily available fly ashes reduces the cost of disposal or storing of such materials from coal-fired power plants. The subject backfill meets all of the engineering requirements for a fast-setting backfill material for road repair work. The basic criteria for such materials are:

1. Be readily flowable to perfectly form around pipes, cables, or other embedments in utility trenches;
2. Achieve a quick initial set to permit paving within about 4 hours;
3. Achieve an initial strength capable of bearing traffic within about 4 hours; and
4. Achieve an ultimate strength of not more than about 150 psi so that the material can be reexcavated when necessary.

The preferred Class C and Class F fly ashes in a ratio of about 1 to 3 with the prescribed amount of water were proportionally blended to arrive at a combined mixture which satisfies all of the aforesaid criteria. Cube samples and cylinder samples were cast in order to measure compressive strength at 2 hours, 4 hours, 24 hours, 7 days and 28 days. Tests were performed after mixing was complete to measure flow characteristics and unit weight.

To simulate field applications of the backfill material, a pad 4 feet by 2 feet by 6 inches deep was cast and a truck tire was driven on it at the various stated time intervals. Basically the material supported the weight associated with a light-duty pickup truck at 2 hours and is capable of carrying the weight associated with a 27,500 lb. truck at 4 hours with only minor deformation of the surface. Penetrometer readings were taken on companion pads to develop a correlation between truck pad results and compressive strength results in quantifiable fashion.

Full scale field tests have been made of the backfill material. A backfilled trench filled with the material was tested to determine how long after placement it could safely carry traffic loads. The test involved filling a trench 4 feet wide by 8 feet long by 5 feet deep with the subject preferred backfill material discharged from a volumetric mobile mixer. A volumetric batch truck was used since preliminary tests indicated that prolonged mixing as would be experienced in a standard transit mixer would delay the initial set and early strength gain. The dry weight proportions necessary to meet the aforesaid criteria with a sufficient safety factor have been met. Exact proportions were adjusted depending upon specific results desired. The process is unique in that the material utilizes no cement and achieves early strength gain in less than 4 hours with no chemical additives. Virtually all of the strength is achieved in the early phases of curing with approximately 60 to 75 percent of the 28-day strength being achieved prior to 7 days. Ultimate strength gain does not prevent reexcavation at a later date.

Other comparable processes normally rely on cement for strength. The Class F fly ash primarily provides bulk for such mixtures. One known mixture and process, in particular, cannot be directly paved over for 16 to 24 hours while it gains sufficient strength. In such applications where quicker turnaround is needed, a high early-strength concrete overlay is placed over the backfill.

The flowable fly ash backfill of this invention is intended for use as a trench backfill mostly for road repair, but may also be utilized in any backfill situation by electric, gas, telephone, water and sewer utilities. A primary advantage is that it provides a high quality backfill with very economical materials utilizing only minimal labor since it may be poured into a trench and is self-leveling, there being no labor intensive compaction of materials around pipes or conduits. Only approximately 4 hours are needed for the backfill material to gain sufficient strength to be paved over. The flowable fly ash backfill provides the desirable objective of reopening streets and highways to traffic more quickly. Safety objectives are also enhanced since personnel are required to be physically present in the trench only for a sufficient time period to perform repairs and installations and not during the backfilling operation.

The designated Rockport and Picway fly ashes (Class C and F respectively) are only set forth by way of example materials which may be beneficially used in the practice of this invention. Obviously, other fly ashes having these broad classifications may be employed. It is not contemplated or required in practicing this invention that the referenced fly ashes conform strictly to the ASTM specifications employed in defining such fly ash classes, but may deviate therefrom in certain respects depending upon their source and method of production in coal-fired power generation stations. The aforesaid fly ashes are stated as representative of their class designations, but may differ therefrom in certain minor characteristics but still reside generally within the broad definitions of the particular classes.

Accordingly, the improved backfill material and method of its installation are simplified providing a effective, safe, inexpensive and efficient backfilling material and method of use which achieves all the enumerated objectives and solves the enumerated problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Having now described the features, discoveries and principles of the invention, the manner in which the improved backfilling material and method of installation are formulated and used in several forms, the characteristics of the construction, and the advantageous, new and useful results obtained; the new and useful structure, devices, elements, arrangements, parts and combination, are set forth in the appended claims.

We claim:

1. A rapid-setting self-hardening flowable backfill composition consisting essentially of a combined mixture of filler material in major amount, Class C fly ash in minor amount, said filler ranging in amount from about 2 to 10 parts by weight to about 1 part by weight Class C fly ash, and sufficient water to react with said Class C fly ash and said filler material to form a self-leveling non-settling flowable material for backfilling introduction into excavated areas of roadways having sufficient early strength to withstand placement of a paving course overlay and subsequent exposure to normal roadway traffic loads within about four (4) hours.

2. A rapid-setting self-hardening flowable backfill composition in accordance with claim 1, wherein said filler material in major amount is selected from the group consisting of Class F fly ash, coal combustion bottom ash, and coal combustion boiler slag.

3. A rapid-setting self-hardening flowable backfill composition in accordance with claim 1, wherein said filler material in major amount is comprised of Class F fly ash.

4. A rapid-setting self-hardening flowable backfill composition accordance with claim 1, wherein said composition is capable of self-hardening to an initial unconfined compressive strength of greater than about 20 psi within about four (4) hours.

5. A rapid-setting self-hardening flowable backfill composition in accordance with claim 1, wherein said composition is capable of curing to approximately 25 to 40 percent of its 28-day strength gain within about four (4) hours.

6. A rapid-setting self-hardening flowable backfill composition in accordance with claim 1, wherein said composition is capable of curing to approximately 60 to 75 percent of its 28-day strength gain within about 7 days.

7. A rapid-setting self-hardening flowable backfill composition in accordance with claim 1, wherein said composition is capable of curing to a maximum strength of about 150 psi to permit ready reexcavation of the material at a subsequent date.

8. A rapid-setting self-hardening flowable backfill composition in accordance with claim 1, wherein said composition is measured and intermixed immediately prior to its installation within utility trenches.

9. A rapid-setting self-hardening flowable backfill composition comprising a combined mixture of Class F fly ash in major amount and Class C fly ash in minor amount, said Class F and Class C fly ashes ranging from about 2 to 10 parts by weight Class F fly ash to about 1 part by weight Class C fly ash, and sufficient water to react with both said Class F and Class C fly ashes, the ratio of said total solids to water being about 2.3 to 1 parts by weight, said composition being measured and intimately intermixed immediately prior to self-leveling flowable introduction of said composition into excavated roadway areas as a non-settling backfill material having an initial unconfined compressive strength of about 20 psi within about 4 hours.

10. A rapid-setting self-hardening flowable backfill composition in accordance with claim 9, the ratio of said Class F fly ash to said Class C fly ash being about 3 to 1 parts by weight.

11. A rapid-setting self-hardening flowable backfill composition in accordance with claim 9, wherein said combined mixture comprises about 52 percent by weight Class F fly ash, about 17 percent by weight Class C fly ash, and about 31 percent by weight water.

12. A rapid-setting self-hardening flowable backfill composition in accordance with claim 9, wherein said backfill composition having sufficient early strength to being overlaid with a separate wearing course of paving material to provide a durable load-bearing roadway surface within about four (4) hours.

13. A rapid-setting self-hardening flowable backfill composition accordance with claim 9, wherein said composition is capable of curing to approximately 25 to 40 percent of its 28-day compressive strength gain within about four (4) hours.

14. A rapid-setting self-hardening flowable backfill composition in accordance with claim 9, wherein said composition is capable of curing to approximately 60 to 75 percent of its 28-day strength gain within about seven (7) days.

15. A rapid-setting self-hardening flowable backfill composition in accordance with claim 9, wherein said composition is capable of curing to a max strength of about 150 psi to permit ready reexcavation of the material at a subsequent date.

16. A rapid-setting self-hardening flowable backfill composition in accordance with claim 9, wherein said composition is measured and intermixed immediately prior to its backfilling installation within excavated roadway trenches to withstand paving course overlays.

17. The method of backfilling excavated trenches in roadways comprising the steps of intimately combining and intermixing a rapid-setting self-hardening flowable backfill composition said composition consisting essentially of filler material in major amount, Class C fly ash in minor amount, said filler material ranging in amount from about 2 to 10 parts by weight to 1 part by weight Class C fly ash, and sufficient water to react with said Class C fly ash and said filler material to form a flowable non-settling backfilling material having sufficient early strength to withstand placement of a paving course overlay and subsequent exposure to normal roadway traffic loads, and introducing said flowable backfilling material in self-leveling relation into excavated areas of roadways, said backfilling material having an initial unconfined compressive strength of about 20 psi within about four (4) hours.

18. The method of backfilling excavated trenches in roadways in accordance with claim 17, includes the step of overlaying the backfilled excavated areas with a separate wearing course of paving material to form a durable roadway surface.

19. The method of backfilling excavated trenches in roadways in accordance with claim 17, includes the step of intimately combining and intermixing said backfill composition immediately prior to introducing same into said excavated areas to substantially fill such areas.

20. The method of backfilling excavated trenches in roadways in accordance with claim 17, wherein said filler material is comprised of Class F fly ash, said Class F fly ash and said Class C fly ash being combined in a ratio of about 3 to 1 parts by weight, the ratio of total solids to water being about 2.3 to 1 parts by weight.

21. The method of backfilling excavated trenches in roadways in accordance with claim 17, said backfill composition is self-curing to a maximum compressive strength of about 150 psi to permit ready reexcavation of the material at a subsequent date.

22. The method of backfilling excavated trenches in roadways in accordance with claim 17, wherein said backfill composition is capable of curing to approximately 25 to 40 percent of its unconfined 28-day compressive strength within about four (4) hours.

23. The method of backfilling excavated trenches in roadways in accordance with claim 17, wherein said backfill composition is capable of self-curing to approximately 60 to 75 percent of its 28-day strength gain within about 7 days.

24. The method of backfilling excavated trenches in roadways in accordance with claim 17, wherein said backfill composition comprises about 52 percent by weight class F fly ash, about 17 percent by weight Class C fly ash and about 31 percent by weight water.

25. The method of backfilling excavated trenches in roadways in accordance with claim 17, wherein said filler material in major amount is selected from the group consisting of Class F fly ash, coal combustion bottom ash and coal combustion boiler slag.

* * * * *